UNITED STATES PATENT OFFICE.

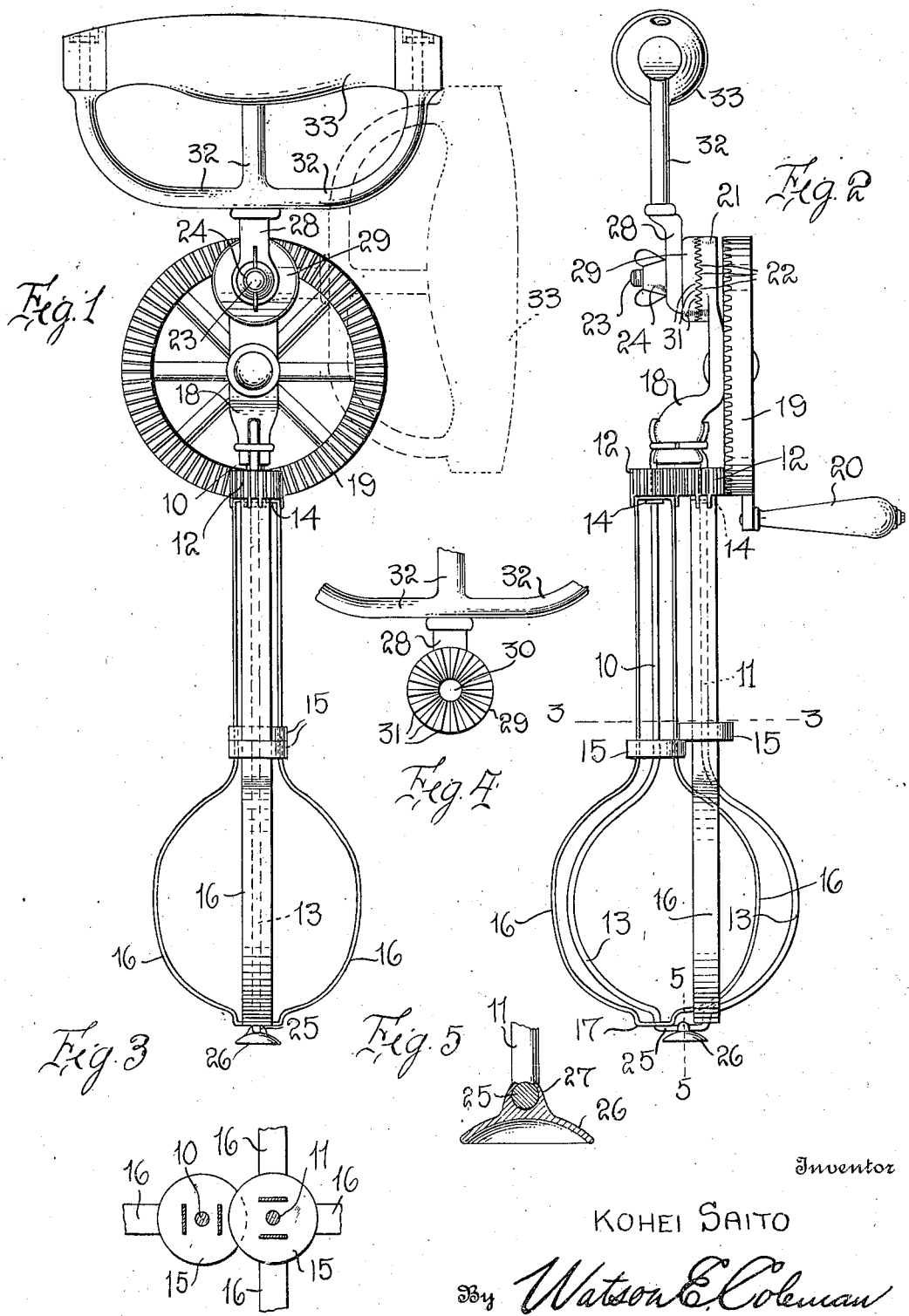

KOHEI SAITO, OF BALTIMORE, MARYLAND.

EGG-BEATER.

1,217,832.  Specification of Letters Patent.  Patented Feb. 27, 1917.

Application filed July 19, 1916. Serial No. 110,185.

*To all whom it may concern:*

Be it known that I, KOHEI SAITO, a subject of the Emperor of Japan, residing at Baltimore, State of Maryland, have invented certain new and useful Improvements in Egg-Beaters, of which the following is a specification, reference being had to the accompanying drawings.

This invention relates to egg beaters in which a plurality of beater shafts are rotated by a single driving wheel.

One object of my invention is to provide an adjustable handle for egg beaters of this character so arranged that the handle may be disposed at any desired angle to the axis of the beater, thereby rendering the beater particularly convenient for use and permitting various applications of the hand to the egg beater.

A further object of this invention is to so construct the handle that a particularly firm hold may be secured upon the egg beater.

Another object of the invention is to provide means for preventing the substance being beaten, being thrown laterally over the bowl in which the beater is being used and, in this connection, to make these means adjustable so that they may be adjusted to various depths of bowls.

Another object is to provide a very simple form of foot for the beater frame.

Other objects will appear in the course of the following description.

My invention is illustrated in the accompanying drawings, in which,

Figure 1 is an elevation of an egg beater constructed in accordance with my invention;

Fig. 2 is a side elevation of the construction shown in Fig. 1;

Fig. 3 is a section on the line 3—3 of Fig. 2;

Fig. 4 is a fragmentary elevation of the handle; and

Fig. 5 is a section on the line 5—5 of Fig. 2.

Referring to the drawings, it will be seen that the egg beater illustrated is in its general construction practically the same as egg beaters already on the market. The beater includes the two parallel rods 10 and 11, on which are mounted the intermeshing gear wheels 12, the rods at their lower ends being outwardly bowed as at 13 and connected by a cross bar 25. Each rod supports a rotatable beater, each beater being formed of a strip of material bent to engage with a complemental gear wheel 12 as at 14, then extended downward to the bend of the rod 10 or 11 and passing through a shield 15, then outwardly bowed as at 16, then extended horizontally as at 17 to have a bearing on the lower end of the corresponding frame member 13, and then again bowed and extended upward and through the shield 15 and up to the corresponding gear wheel. The rods 10 and 11 are connected in any suitable manner to an angular bracket 18 upon which is mounted the driving gear wheel 19 having the handle 20, this gear wheel meshing with one of the gear wheels 12. The bracket 18 has upon its upper end the annular seat 21 which is formed with a plurality of radial teeth 22 and with a central screw threaded stud bolt 23 engageable with the nut 24 which is illustrated as a wing nut. The lower ends of the portions 13 of the rods on which the beaters 16 are mounted are connected by means of a cross piece 25 and attached to this cross piece is a concavo-convex foot or base 26, the upper face of this base or foot being provided with lips 27 which extend over and embrace the connecting member 25, as illustrated most clearly in Fig. 5.

The handle of the beater, as illustrated in Fig. 4 is separate from the beater proper and is preferably formed of a casting 28. The lower end of this casting is provided with the disk 29 having a central screw threaded aperture 30 and radially arranged teeth 31 adapted to coact with the teeth 22 on the annular portion 21 of the bracket 18. The stud bolt 23 passes through the aperture 30 and the wing nut 24 holds the handle in tight engagement with the bracket 18 and at any angle desired. Preferably the upper end of the casting 28 is formed to provide three arms 32 and a wooden handle proper 33 connects these arms. These three arms, as illustrated in Fig. 1 permit the hand of the operator to grasp the handle very firmly and prevent the handle turning, the middle arm passing between the fingers of the operator's hand.

The shields 15 are rotatable with the strips 14 and with the shafts 10 and 11. These shields or disks 15 are made relatively heavy so as to act to a certain extent as fly wheels. Furthermore, these disks form barriers or shields which prevent the liquid which is being beaten from rising up at the center of the beater and being thrown off laterally. If the material is being beaten in a relatively shallow bowl or cup, the liquid is very liable to be thrown off above the upper edge of the bowl or cup and splash. I have found in practice that these shields prevent anything of this kind. Furthermore, inasmuch as the shields are slidably mounted upon the strips 14 and the shafts they may be adjusted vertically to a higher or lower point, according to the depth of the bowl and the depth of the liquid being beaten.

Attention is particularly called to the advantages resident in the adjustable handle. Where a person is sitting down and using the ordinary beater it is usually inconvenient to hold the beater in a vertical position if the hand of the operator extends in a horizontal position. Furthermore, some persons will place the hand directly on top of the beater while others wish to place the hand at the side of the beater to one side of the center. My adjustable handle permits the handle to be disposed in any convenient relation so that the handle may be disposed in a vertical position for instance of the beater but preventing the proper use of the beater but on the contrary increasing convenience to the operator. It will be seen that my invention adds very much to the convenience of the beater, that the disks 15 act to steady the beater and add to the ease with which it may be operated at high speeds and that the foot 26 will take a firm hold upon the bottom of a bowl or cup. While I have illustrated my invention applied to one form of beater, this being the form ordinarily found in shops, yet it is to be understood that the invention may be also applied to other forms of beater without departing therefrom.

Having described my invention, what I claim is:

1. In an egg beater, rotatable elements extending in parallel relation, means for rotating said elements, and a disk forming a fly wheel and a shield and extending at right angles to the axis of rotation of said elements and being adjustable longitudinally upon said elements.

2. In an egg beater, a pair of rotatable elements mounted for rotation in a reverse direction and having portions extending in parallel relation, means for rotating said elements, and disks one for each element, each disk being slotted for the passage of the element and constituting a fly wheel and a shield and extending in a plane at right angles to the axis of rotation of the element and each disk being adjustable longitudinally upon its corresponding element.

In testimony whereof I hereunto affix my signature in the presence of two witnesses.

KOHEI SAITO.

Witnesses:
F. B. WRIGHT,
M. R. WILSON.